United States Patent
Tregenza Dancer

(10) Patent No.: US 10,965,497 B1
(45) Date of Patent: Mar. 30, 2021

(54) PROCESSING TRAFFIC IN A VIRTUALISED ENVIRONMENT

(71) Applicant: Metaswitch Networks Ltd., Enfield (GB)

(72) Inventor: Colin Tregenza Dancer, Enfield (GB)

(73) Assignee: Metaswitch Networks Ltd., Enfield (GB)

(*) Notice: Subject to any disclaimer, the term of this patent is extended or adjusted under 35 U.S.C. 154(b) by 0 days.

(21) Appl. No.: 16/831,457

(22) Filed: Mar. 26, 2020

(30) Foreign Application Priority Data

Oct. 10, 2019 (GB) ..................................... 1914675

(51) Int. Cl.
*H04L 12/46* (2006.01)

(52) U.S. Cl.
CPC ...... *H04L 12/4675* (2013.01); *H04L 12/4633* (2013.01)

(58) Field of Classification Search
CPC ........................ H04L 12/4675; H04L 12/4633
See application file for complete search history.

(56) References Cited

U.S. PATENT DOCUMENTS

| | | | |
|---|---|---|---|
| 2013/0318219 A1* | 11/2013 | Kancherla | H04L 41/0806 709/222 |
| 2015/0381494 A1 | 12/2015 | Cherian et al. | |
| 2018/0062880 A1 | 3/2018 | Yu et al. | |
| 2019/0068456 A1 | 2/2019 | Lotfi et al. | |

FOREIGN PATENT DOCUMENTS

WO     2016155589 A1    10/2016

OTHER PUBLICATIONS

Arista Data Center Interconnection with VXLAN, Version 1.0, Nov. 2014.
Mellanox Technologies: VXLAN Considerations for ConnectX-3 Pro, Apr. 7, 2019.
Installation instruction for Fuel@OPNFV, Document retrieved Aug. 27, 2019.

(Continued)

*Primary Examiner* — Kiet Tang
(74) *Attorney, Agent, or Firm* — EIP US LLP

(57) ABSTRACT

Traffic is processed in a virtualised environment comprising: (i) a physical underlay network; (ii) a first overlay network (an overlay of the physical underlay network and associated with a first set of network addresses, $IP_1$); (iii) a second overlay network (an overlay of the first overlay network and associated with a second set of network addresses, $IP_2$); and (iv) virtualised applications each having an execution environment and being associated with at least one network address in each of the first and second sets of network addresses, $IP_1$ and $IP_2$. In the execution environment of a first virtualised application: (i) traffic communicated from the first virtualised application to the first overlay network is encapsulated; and/or (ii) traffic communicated from the first overlay network to the first virtualised application is decapsulated. Tenant separation processing is performed outside the execution environments of the virtualised applications.

18 Claims, 3 Drawing Sheets

(56) References Cited

OTHER PUBLICATIONS

Combined Search and Exam Report dated Dec. 6, 2019 for GB1914675.2.
Response to Section 18(3) dated Jan. 28, 2020 for GB1914675.2.
No Further Objections dated Mar. 2, 2020 for GB1914675.2.
Arista VXLAN Scaling Data Center Capacity, https://www.arista.com/en/solutions/vxlan-cloud-scale-datacenter Jan. 2016.
Cumulus Linux Bridge l2-overlays, NETDEV 2.2, The Technical Conference on Linux Networking, Nov. 8-10, 2017.
Cisco VXLAN Interfaces, CLI Book 1: Cisco ASA Series General Operations CLI Configuration, Mar. 20, 2015.
International Search Report and Written Opinion dated Dec. 15, 2020 for PCT Application No. PCT/GB2020/052441.

\* cited by examiner

PROCESSING TRAFFIC IN A VIRTUALISED ENVIRONMENT

CROSS-REFERENCE TO RELATED APPLICATIONS

This application claims priority to GB Application No. GB1914675.2, filed Oct. 10, 2019, under 35 U.S.C. § 119(a). Each of the above-referenced patent applications is incorporated by reference in its entirety.

BACKGROUND

Technical Field

The present disclosure relates to measures (for example methods, virtualised environments, networking components and computer programs) to process traffic in a virtualised environment.

Background

In known public clouds, both (i) enforced separation of traffic between different tenants (also known as "users") and (ii) encapsulation of traffic to run over a common (also known as "shared") network are implemented in hardware. The common network runs one or more so-called "overlay" networks over a common so-called "underlay" network. One such hardware implementation is a smart network interface controller ("SmartNIC"). Another such hardware implementation involves coordinated setup of ToRS ("Top-of-Rack Switches") with NICs which can separate traffic based on Virtual Local Area Network (VLAN) tags. Such hardware implementations give a cloud provider high Central Processing Unit (CPU) efficiency by allowing single-root input/output virtualisation (SR-IOV), using accelerated networking, to a virtualised application (such as a virtual machine (VM) or a container) without using host CPU. However, such hardware implementations involve a relatively advanced automation system. In addition, the range of encapsulations and/or routing useable as part of the overlay networking is limited by the capabilities of the hardware and, typically, by intentional limitation of features provided in the hardware to simple Layer 3 (L3) networking, which suffices for the vast majority (for example, 99%) of cloud workloads.

In known private clouds, tenant separation and overlay encapsulation occurs in a virtual router (vRouter) running in a hypervisor or container host. This gives a wider range of networking options (for example, Layer 2 (L2) functionality) than a hardware-based approach. However, this is at the expense of greatly increased CPU overhead. Such increased CPU is most visible when virtualised applications only carry out minimal processing on each packet. The physical underlay network is also commonly more tightly coupled to the overlay network in such implementations, with direct use of VLAN tags being common. While this may be sufficient for small networks, it does not scale, owing to a limit of 4096 VLANs and performance concerns with large broadcast domains.

In both cases (public and private clouds), the security and overlay element is under full control of the cloud provider. The cloud provider can thereby stop any untrusted code subverting the security.

Security and overlay element performance may be improved using (well-supported) Access Control Lists (ACLs). ACLs allow simple rules to be pushed down from the overlay to hardware. For example, a physical NIC can be programmed to allow only certain logical processes access to traffic to a specific Internet Protocol (IP) address or with a specific VLAN tag. Programming ACLs into the NIC itself can also be carried out quickly. In addition, all traffic passing through the host first passes through the NIC, before a guest can access it. Equally, simplistic security logic can be pushed out to a different device (other than an NIC) to perform security processing before the traffic arrives at the host. An example of such a device is a top-of-rack router. However, in both cases (NICs with ACLs and devices), the networking complexity that can be applied is severely limited. In addition, since cloud providers generally wish to offer complex networks, they cannot assume all networking will be this simple. As a result, the cloud environment tends to handle such networking functions.

Finally, known models for implementing overlay networks place the key responsibility on individual cloud orchestrators. This makes creating networks which span different cloud providers and/or technologies (such as VMs, containers and bare-metal) difficult.

SUMMARY

According to first embodiments, there is provided a method of processing traffic in a virtualised environment, the virtualised environment comprising: a physical underlay network; a first overlay network, the first overlay network being an overlay of the physical underlay network and being associated with a first set of network addresses; a second overlay network, the second overlay network being an overlay of the first overlay network and being associated with a second set of network addresses; and a plurality of virtualised applications, each of the virtualised applications in the plurality of virtualised applications having an execution environment and being associated with at least one network address in the first set of network addresses and at least one network address in the second set of network addresses, the method comprising performing, in the execution environment of a first virtualised application in the plurality of virtualised applications, encapsulation of traffic communicated from the first virtualised application to the first overlay network and/or decapsulation of traffic communicated from the first overlay network to the first virtualised application, wherein tenant separation processing is performed outside the execution environments of the plurality of virtualised applications.

According to second embodiments, there is provided a method of processing traffic in a virtualised environment, the virtualised environment comprising a physical underlay, an overlay network, and a virtualised application, wherein the physical underlay and/or the overlay network comprises a security element configured to provide tenant separation processing, the method comprising: receiving encapsulated traffic from the overlay network, the encapsulated traffic having been subject to tenant separation processing by the security element; decapsulating the received traffic; and providing the decapsulated traffic to the virtualised application, wherein the method is performed by a networking component in the execution environment of the virtualised application, and wherein the networking component is separate from the virtualised application.

According to third embodiments, there is provided a virtualised environment configured to perform a method according to the first and/or second embodiments.

According to fourth embodiments, there is provided a networking component configured to perform a method according to the first and/or second embodiments.

According to fifth embodiments, there is provided computer software adapted, when executed, to perform a method according to the first and/or second embodiments, According to sixth embodiments, there is provided a virtualised environment comprising a physical underlay, an overlay network, and a plurality of virtualised applications, wherein: an execution environment of a first virtualised application of the plurality of virtualised applications comprises a networking component configured to: encapsulate traffic received from the first virtualised application and to provide the encapsulated traffic to the overlay network; and/or decapsulate encapsulated traffic received from the overlay network and to provide the decapsulated traffic to the first virtualised application; and an execution environment of a second virtualised application of the plurality of virtualised applications is configured to: provide traffic received from the first virtualised application and to the overlay network without performing said encapsulating; and/or provide traffic received from the overlay network to the first virtualised application without performing said decapsulating.

Further features will become apparent from the following description, given by way of example only, which is made with reference to the accompanying drawings.

DETAILED DESCRIPTION

Figure 1:
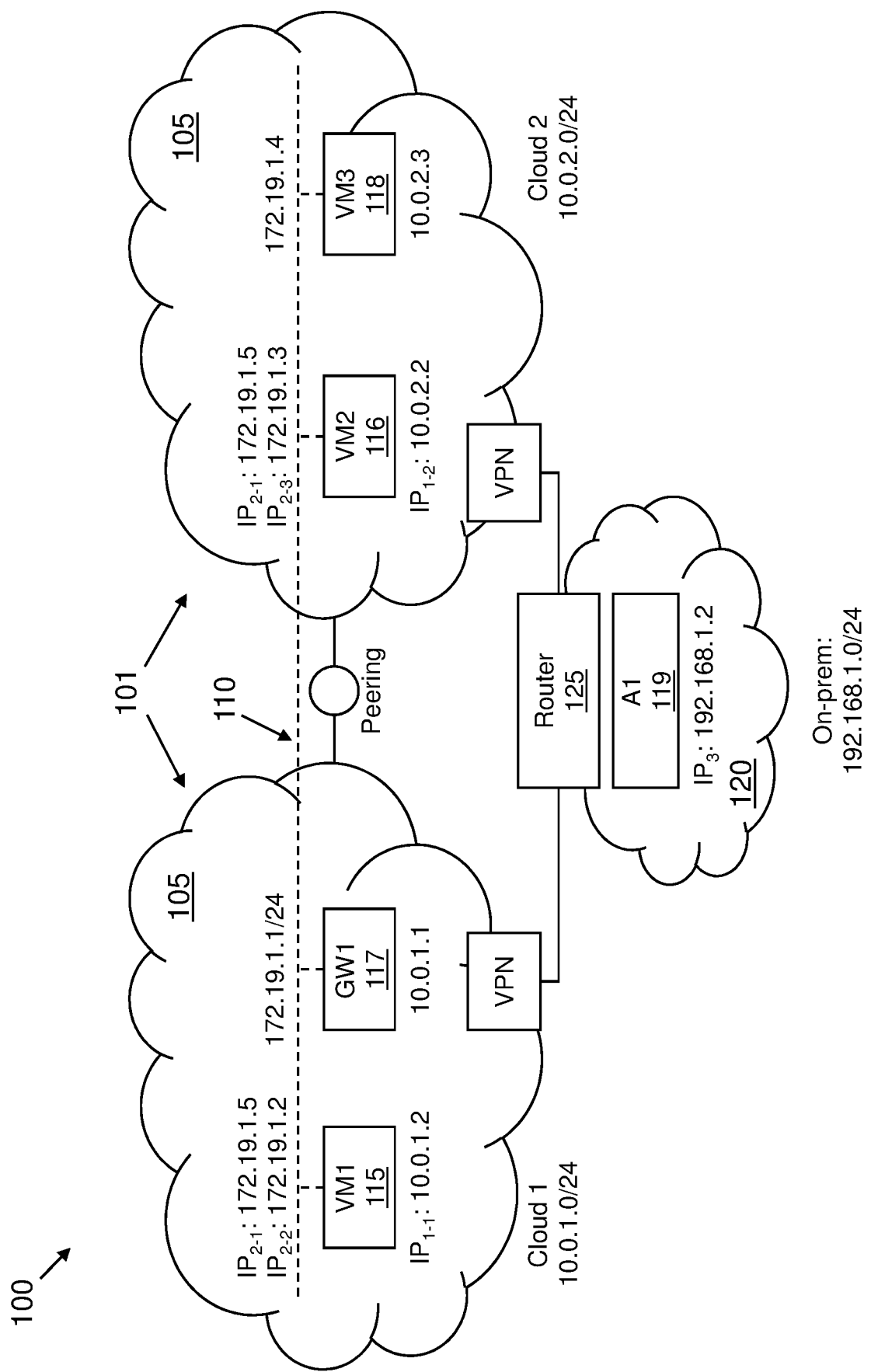
FIG. 1 shows a schematic diagram of an example of a network.

Examples described herein provide more efficient virtualisation of networking, namely the provision of one or more logical networks over a common overlay, in a manner which can coexist with the limitations of compute virtualisation environments, such as VMs and containers. Examples described herein provide high-performance packet-processing technology, for example for VMs or containers, that runs in a virtualised environment with the ability to connect to multiple independent networks and with a range of features such as VLAN tags, overlapping L3 address ranges, and L2 functionality. Examples described herein also enable traditional on-prem (also known as "on-premises") networks to run either entirely in the cloud or in a hybrid on-prem/in-cloud mode. In overlay networks implemented in existing virtualisation environments, such functionality may not be available. For example, public clouds generally only offer simple L3 networks, where the cloud provider controls IP address allocation. Even if such functionality is available, for example in custom cloud environments installed on bare-metal servers, the overheads of running with existing, hypervisor-based overlay networking are sufficiently high that they can often equal or exceed the cost of the processing being performed by the virtualised application, as explained above. In contrast, examples described herein enable virtualised applications to run efficiently, both (i) in public clouds where the hypervisor is under the control of the cloud provider and (ii) in private clouds where the hypervisor can readily be controlled but where using that access is generally performance-prohibitive. Examples also enable networks to extend across clouds from different providers, and/or between VMs, containers and bare-metal hosts. Additionally, existing features, such as KeepaliveD (the keepalive daemon), that have previously been used to add high-availability (HA) to applications and which rely on L2 connectivity, can be enabled to be run in the cloud.

As will be described in more detail below, examples provide enhanced virtualisation of networking, such as described above, by separating out two distinct elements for virtual networking, namely a security element and a networking element, and only providing the security element in the cloud infrastructure. In particular, in examples, security and tenant separation functionality is located in the cloud environment or orchestrator. If tenant separation were managed in virtualised applications, a bad actor could try to access traffic it was not entitled to access. In addition, the cloud orchestrator has the information (namely, different virtualised applications and their current locations) to perform tenant separation correctly. Further, tenant separation is per-cloud decision. Logically, the concern is primarily around virtualised applications accessing information for virtualised applications in the same cloud, where the fact that they are running on the same underlying hardware exposes new attack vectors.

Examples described herein also create a new overlay, referred to herein as a "superlay", which is an overlay network on top of another overlay network. In examples, a new component (referred to herein as a "superlay networking component" or the like) runs in the security context of the tenant, and in the execution environment (for example, VM or container) used to run the virtualised application. The term "security context of the tenant" (and the like) is used herein to mean that the new component only has permissions associated with the particular VM or container with which it is associated and, hence, cannot change any overlay tenant separation implemented using ACLs. The term "execution environment" (and the like) is generally used herein to mean a VM or container in which an application runs but can have a similar, but broader, meaning in other instances. For a VM, superlay code may be a mix of driver code in the Operating System (OS) kernel and a control application running as an OS process in userspace. The application may run as a separate OS process in userspace. The difference is mainly related to packaging and delivery, compared to building a VM using a cloud-provided golden image (which the cloud provider keeps up to date with security patches), into or onto which the application is installed. In examples, superlay networking support is installed into the base image, either by a service provider or a user, and the application is then installed on top. The superlay networking component therefore does not run in hardware or in the cloud, but within the execution environment of a guest virtualised application. In examples, the superlay networking component implements anything beyond the most basic routing and encapsulation decisions implemented in the underlay. The superlay networking component may, for example, be implemented using a Virtual Extensible LAN (VXLAN) driver and/or an Ethernet Virtual Private Network (EVPN) stack available for Linux. As such, instead of the infrastructure implementing a superset of all protocols used across all virtualised applications, the underlay may only provide simple L3 networking; a simple L3 network may readily be implemented in hardware. Those virtualised applications using more advanced overlays with more advanced networking features include the new superlay networking logic in their execution environment to implement additional functions on top of what the cloud provides. Those virtualised applications that do not use the more advanced networking features do not use the new superlay networking logic but can still use the basic cloud-provided functions. As such, a given cloud can support a mixture of superlay-enabled and non-superlay-enabled applications. In addition, the new superlay networking logic exposes new superlay interfaces to virtualised applications. Virtualised applications use the new superlay interfaces instead of native interfaces to the cloud. In effect, in examples, there is a physical underlay (per existing network architectures) and a cloud-provided overlay (per existing network architectures) but also an over-overlay (the superlay). The superlay is implemented in the security context or execution environment of the virtualised application. However, as with the OS, NIC drivers and support services, the superlay networking logic is not part of (in other words, "built into" or "linked with") the virtualised application itself. As such, existing virtualised applications can be enabled to use the superlay via the separate superlay networking logic, with little or limited modification to the virtualised application itself.

In accordance with examples described herein, resources that would be used to implement such functionality more generically are not incurred, clouds are not made more complicated, and cloud providers are not required to make changes they would be unwilling to make. A public cloud provider can, for example, safely rely on the superlay function being implemented in the security context of the tenant, because inter-tenant protection remains under the control of the public cloud provider. By implementing the superlay outside the cloud, the superlay network can be extended and coordinated across multiple clouds and to one or more multiple on-prem networks. Users of the superlay may be distributed geographically and/or may take advantage of multiple incompatible cloud frameworks. The superlay can be connected to existing networks via a series of routers and/or gateways which can exist within the cloud(s) or externally. Further, swift networking may be achieved, while mitigating at least some of the considerations described above. Taking advantage of SR-IOV may, for example, allow between two and three times as many packets to be processed relative to a vRouter-based implementation. For example, an application that performs minimal processing carries out similar work to sending a packet through a hypervisor vSwitch. As such, in the hypervisor vSwitch case, each packet goes from a wire, to the hypervisor, to the application, to the hypervisor and to the wire, with at least three CPU cores touching each packet at roughly the same cost. In contrast, in examples, only the application core touches the packet, so CPU usage is about one third of the hypervisor case, whereby two or three times as many packets can pass through the system. Examples described herein do not presume any specific physical underlay network or cloud orchestrator. If basic functionality used for minimal routing is provided in the cloud, examples described herein may work on any relevant technology. Examples allow public cloud providers not to overcomplicate their cloud environment such that basic applications which do not use complex routing are supported, while also providing support for complex routing between virtualised applications that use it. Examples allow for advances in routing technology to be implemented without the cloud provider necessarily upgrading their cloud(s). Examples allow fully flexible mixing of workload types, for example bare-metal, VMs, containers, nested containers, nested VMs, etc. In examples, traffic routing can be made more effective by allowing direct sending of packets, bypassing routers and/or cloud hops.

Referring to FIG. 1, there is shown schematically an example of a network 100. In the example network 100, an overlay function in the form of a superlay networking component is separate from a tenant separation (or "security") function. The example network 100 thus differs from a network in which overlay and tenant separation functionality are not separated, for example where overlay and tenant separation functionality are both implemented in hardware or in a hypervisor.

The example network 100 network comprises a virtualised environment 101 in which traffic, such as one or more packets, is processed. The virtualised environment 101 comprises a physical underlay network (not shown in FIG. 1).

The virtualised environment 101 also comprises a first overlay network 105. The first overlay network 105 is an overlay of the physical underlay network. The first overlay network 105 is associated with a first set of network addresses (denoted "$IP_1$"), which in this specific example are 10.0.1.0/24 and 10.0.2.0/24. 10.0.1.0/24 will be understood to indicate a range of IP addresses starting at 10.0.1.0, with the first twenty-four bits being a network prefix and the remaining eight bits being a host address; similar notation as used herein should be understood accordingly. In this example, $IP_1$ comprises first and second subsets of network addresses, which in this specific example are 10.0.1.0/24 and 10.0.2.0/24 respectively. In this example, the first and second subsets of network addresses correspond to different subnets (also known as "subnetworks") and are associated with first and second cloud networks respectively, denoted "Cloud 1" and "Cloud 2" respectively.

The virtualised environment 101 comprises a second overlay network 110, which in this example is a superlay (or "superlay network"). The superlay 110 is indicated in FIG. 1 using dashed lines. In this example, the superlay 110 is associated with a second set of network addresses (denoted "$IP_2$"), which in this specific example is 172.19.1.1/24.

The virtualised environment 101 comprises a plurality of virtualised applications 115, 116, 117, 118. In this specific example, the virtualised environment 101 comprises four virtualised applications, denoted VM1 115, VM2 116, GW1 117 and VM3 118, but could comprise a different number of virtualised applications, could comprise containers etc. in other examples. At least one of VM1 115, VM2 116, GW1 117 and VM3 118 provides telephony network element functionality. Examples described herein using the superlay 110 are particularly, but not exclusively, effective in the context of telephony and telephony networks. In particular, the superlay 110 can be used to provide geographic redundancy via multiple clouds, which can give high uptime. This can be particularly, but not exclusively, effective for emergency calls. Telephony networks may feature relatively complex routing decisions (compared to other types of network) comprising multiple functions which route between each other, which can be supported via the superlay 110. This is in contrast to other systems in which virtualised applications are comparatively simplistic, using relatively few functions with simple routing between them. In addition, telephony networks have a balance between edge-of-network processing and routing, and inner network routing and processing. The superlay 110 is also particularly, but not exclusively effective, in an enterprise environment where L2 applications are migrated from on-prem to the cloud and/or where an HA pair is split between an on-prem and a cloud site. This may be applicable in the context of telephony or otherwise. The telephony network element functionality may comprise Session Border Controller (SBC) functionality, Telephony Application Server (TAS) functionality, cellular network core (for example, 5G networking core) functionality, application server (AS) functionality, etc. In this specific example, VM1 115, VM2 116 and VM3 118 all provide telephony network element functionality. At least one of VM1 115, VM2 116, GW1 117 and VM3 118 provides gateway functionality. In this specific example, GW1 117 provides gateway functionality.

Each of VM1 115, VM2 116, GW1 117 and VM3 118 has an execution environment. In particular, the execution environment of VM1 115 comprises (i) VM1 115 and (ii) another component (not shown) in the form of the superlay networking component. As explained above, the superlay networking component performs encapsulation and/or decapsulation. The superlay networking component could perform (i) encapsulation and not decapsulation, (ii) decapsulation and not encapsulation or (iii) both encapsulation and decapsulation, for example depending on the nature of the associated virtualised application. For example, a database may receive but not transmit data, for instance in the case logging or billing servers. However, reliable transport may involve at least acknowledgements, so messages may flow both into and out of the superlay networking component. The superlay networking component, in effect, hides the native interface to the first overlay network 105 in the VM1 115 guest and may, therefore, allow VM1 115 to be installed unchanged or substantially unchanged compared to the superlay networking component not being provided in the execution environment of VM1 115.

Each of VM1 115, VM2 116, GW1 117 and VM3 118 is associated with at least one network address in $IP_1$ and at least one network address in $IP_2$.

In this example, VM1 115 is associated with a first network address in $IP_1$ (denoted "$IP_{1-1}$"), which in this specific example is 10.0.1.2. $IP_{1-1}$ is associated with Cloud 1. VM1 115 is also associated with a first network address in $IP_2$ (denoted "$IP_{2-1}$"), which in this specific example is 172.19.1.5. VM1 115 is also associated with a second network address in $IP_2$ (denoted "$IP_{2-2}$"), which in this specific example is 172.19.1.2. In this example, $IP_{2-1}$ is a virtual IP address and VM1 115 initially serves as a primary virtualised application associated with the virtual IP address, $IP_{2-1}$.

VM2 116 is associated with a second network address in $IP_1$ (denoted "$IP_{1-2}$"), which in this specific example is 10.0.2.2. $IP_{1-2}$ is associated with Cloud 2. VM2 116 is also associated with a third network address in $IP_2$ (denoted "$IP_{2-3}$"), which in this specific example is 172.19.1.3. In this example, VM2 116 initially serves as a backup virtualised application associated with the virtual IP address, $IP_{2-1}$, and is thereby also associated with $IP_{2-1}$.

In this specific example, GW1 117 is associated with an IP address 10.0.1.1 in $IP_1$ and an IP address 172.19.1.1 in $IP_2$. In this specific example, VM3 118 is associated with IP address 10.0.2.3 in $IP_1$ and IP address 172.19.1.4 in $IP_2$.

The example network 100 comprises a fifth application 119 (denoted "A1"), which is a non-virtualised (also known as a "non-cloud") application. A1 119 is associated with a network address (denoted "$IP_3$") associated with a third network 120 which is different from the first overlay network 105 and the superlay 110. In this example, the third network 120 is a non-cloud, on-prem network. In this example, an on-prem router or gateway 125 is provided at the non-cloud site associated with the third network 125 to enable the superlay 110 in Cloud 1 and Cloud 2 to be extended to the non-cloud site. The superlay 110 may be extended to more than one non-cloud site in the same or a similar manner. In other examples, a superlay networking component (for example a superlay driver or access logic) is built directly into a non-cloud application, such as A1 119. As such, the on-prem router or gateway 125, which would otherwise be used to access the superlay 110, may be omitted.

In this example, A1 119 is a client application wanting to access an application associated with $IP_{2-1}$. A1 119 transmits, via the router 125, a packet for $IP_{2-1}$ having $IP_{2-1}$ and $IP_3$ as destination and source addresses respectively. The transmitted packet is routed via Cloud 1 to GW1 117 since GW1 117 receives all traffic directed to $IP_2$ addresses. GW1 117 determines whether $IP_{2-2}$ or $IP_{2-3}$ is currently associated with $IP_{2-1}$. Such determination may involve GW1 117 examining a current route table entry associated with $IP_{2-1}$. In this example, GW1 117 determines that $IP_{2-2}$ (and not $IP_{2-3}$) is currently associated with $IP_{2-1}$ and transmits, via the first overlay network 105, encapsulated data comprising the received packet to VM1 115. In this example, GW1 117 adds a header with $IP_{1-1}$ as a destination address, with $IP_{2-1}$ inside. The encapsulated packet is routed from GW1 117 towards VM1 115 on the first underlay network 105 via Cloud 1. The superlay networking component in the execution environment of VM1 115 receives the encapsulated packet, decapsulates the encapsulated packet, and passes the decapsulated packet to VM1 115. The decapsulated packet has $IP_{2-1}$ as a destination address. The superlay networking component can encapsulate a packet sent by VM1 115 (for example, in response to the received packet) before passing the encapsulated packet into the first underlay network 105 via Cloud 1.

In this specific example, an event occurs which causes VM2 116 (instead of VM1 115) to be associated with $IP_{2-1}$. The event may be failure of the VM1 115, leading to failover from VM1 115 to VM2 116. GW1 117 would then route a received packet directed to $IP_{2-1}$ to VM2 116 using $IP_{1-2}$ (instead of $IP_{1-1}$) as a destination address.

GW1 117 and the control planes of VM1 115, VM2 116 and VM3 118, which are located across different clouds (namely, Cloud 1 and Cloud 2), exchange control information between each other and with entities (such as the on-prem router or gateway 125) located in bare-metal networks. Direct L3 overlay connectivity between such entities allows traffic to be sent directly between endpoints in different clouds over the superlay, in other words not via GW1 117. This also allows mobility of L2 and L3 addresses between locations, irrespective of the limits of the first overlay network 105. In the absence of direct L3 connectivity between applications, but where there is L3 connectivity between gateways in different clouds, the applications route packets via the gateways. In this example, VM1 115, VM2 116, and VM3 118 can communicate directly with each other, without traffic having to pass via GW1 117.

In the example network 100, tenant separation is performed outside the execution environments of VM1 115, VM2 116, GW1 117 and VM3 118. Tenant separation may be performed in the physical underlay network and/or by a hypervisor, for example using ACLs and/or VLAN tags.

A given virtualised application (not shown in FIG. 1) may communicate traffic with the first overlay network 105 without such encapsulation and/or decapsulation being performed within the execution environment of the given virtualisation application. In particular, as explained above, the given virtualised application may not use complex networking and can access the first overlay network 105 directly.

If multiple non-cloud sites have direct L3 access to each other, traffic (for example, between two applications in respective on-prem networks) can bypass the first overlay network 105 entirely, even if the control plane element runs in the cloud. This may greatly reduce bandwidth usage in the first overlay network 105.

The example network 100 differs from a public cloud setup in which the first overlay network 105 is an L3 network, but where the superlay 110 is not provided. Contrary to the example network 100, such a setup would not provide the virtualised applications 115, 116, 117, 118 with L2 connectivity. Furthermore, the example network 100 also differs from a private cloud setup having the first and second overlay networks 105, 110, but where the second overlay network 110 occurs in a hypervisor. In contrast, in the example network 100, encapsulation and/or decapsulation occurs in a layer running in the execution environment of the virtualised applications 115, 116, 117, 118, while the physical underlay and/or the first overlay network 105 provides only security separation between tenants.

As such, examples can provide a centrally managed, centrally controlled and/or centrally secured overlay network, with the superlay logic running in the application execution environment. The superlay logic may, for example, implement VXLAN encapsulation. However, other (for example, proprietary) encapsulations may be used. Security may be provided by hypervisor and/or hardware solutions (for example, VXLAN Tunnel Endpoint (VTEP) hardware solutions), which provide tenant separation, but at the cost of performance Superlay logic is provided separately, for example via Linux VXLAN support, which does not provide tenant separation or central management. The hybrid approach described herein (for example with ACLs in hardware under cloud control for security, encapsulation and/or decapsulation in the application execution environment, and centralised control) offers effective features in terms of both security and networking flexibility.

The superlay networking element may be provided in a library or module which can be linked in with high-performance poll mode applications. For example, the superlay networking element may be packaged as a Data Plane Development Kit (DPDK) module. Code may therefore be linked in with the application itself, but the superlay networking element would be a fully separate, self-contained layer, with the application just passing down an opaque token to provide configuration and authorisation. As such, an application, such as a client, may use a token to perform automatic configuration to allow the application to join a given network. In particular, the token may be passed into a VM at creation time, for example as part of "cloudinit" data or a "config drive". The VM would autoconfigure on first boot with all the network interfaces to be used. The token may also reference a profile with details for multiple separate superlay networks or details of native networks to use in parallel, along with details of routing tables for all of the networks (superlay and/or native) to operate together.

Figure 2:
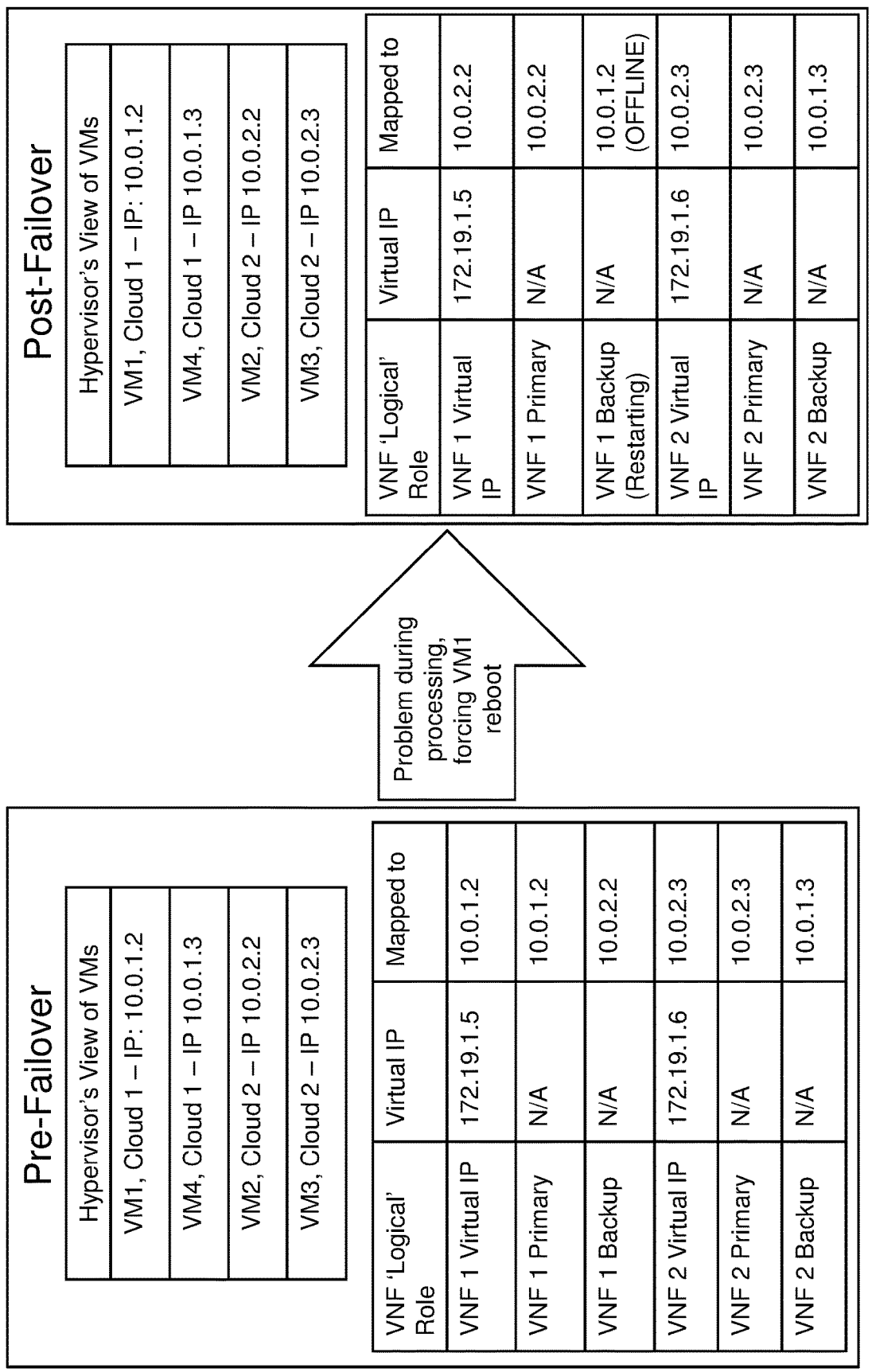
FIG. 2 shows a schematic diagram of an example of two route tables and associated data.

Referring to FIG. 2, there is shown schematically example route tables and associated data.

In this example, there are two Virtualised Network Functions (VNFs), each of which has a primary and a backup virtualised application (also referred to herein as a "node") spread across two clouds, namely Cloud 1 and Cloud 2. Each VNF also has a virtual IP address. The two virtual IP addresses, associated with the two logical VNFs, are mapped to the IP address of the primary node making up the VNF in each case. The primary node may be selected in various different ways from those VMs making up the VNF. Although two nodes are used in this example (a primary and a backup), a different number of nodes may be used in other examples. For example, a different number of backup nodes may be used.

In this example, VNF1 detects a problem with VM1. VM1 restarts or takes steps to repair itself. For example, VM1 may recreate itself or may move to a different server in a manner that interrupts normal processing. VNF1 recognises the loss of VM1, and VM2 becomes the new primary for VNF1. VM1 is now considered a backup for VNF1. The virtual IP address associated with VNF1 is (re-)mapped to the new primary, namely VM2. When VM1 recovers or is replaced, VM1 or its replacement becomes a backup for VNF1. As nothing has happened to VM3 or VM4, VNF2 is unchanged. As the failover (also known as "handover") is quick, the two virtual IP addresses, 172.19.1.5 and 172.19.1.6, continue to route to a working VM, performing VNF processing, throughout the handover.

Figure 3:
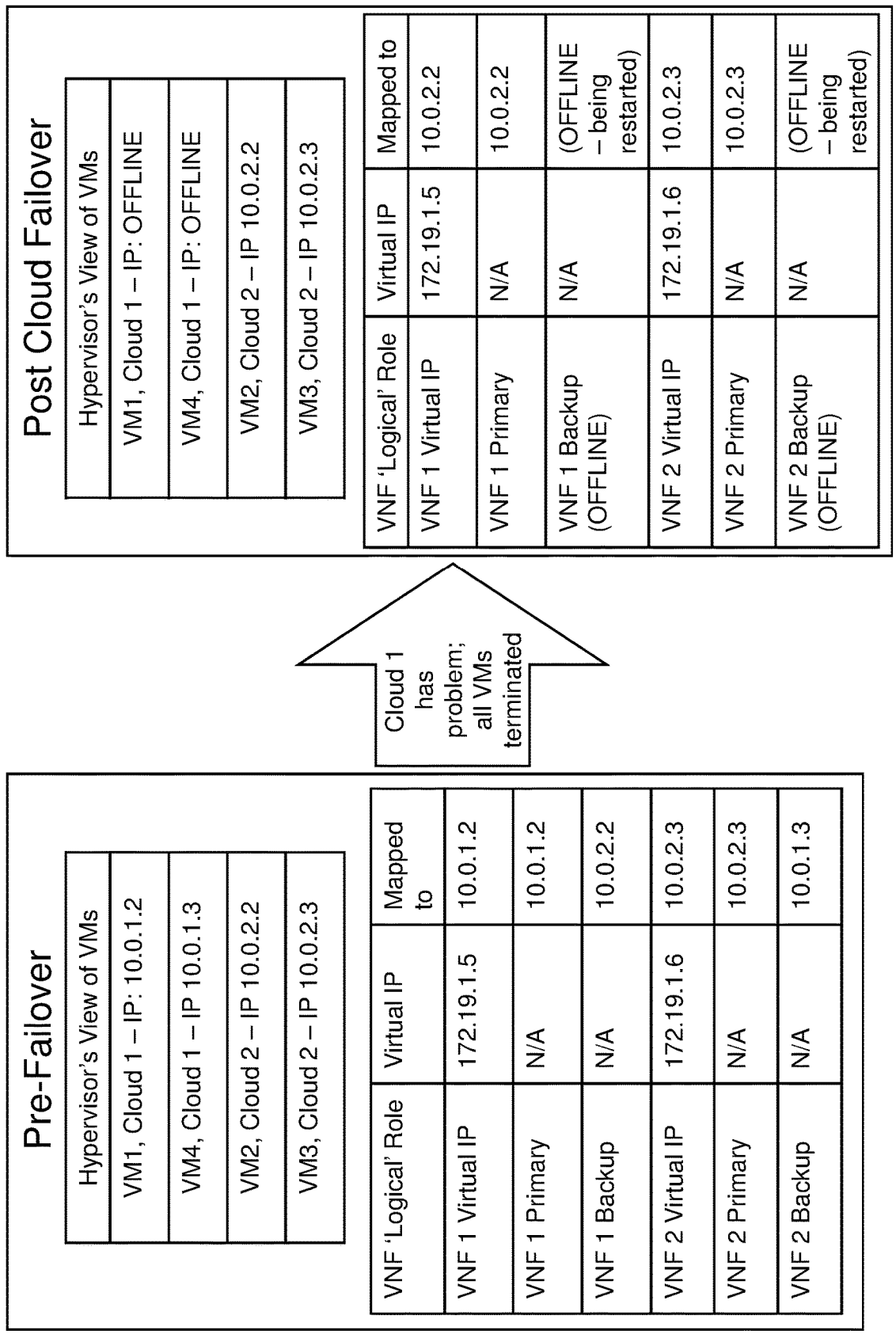
FIG. 3 shows a schematic diagram of another example of two route tables and associated data.

Referring to FIG. 3, there is shown schematically further example route tables and associated data.

In this example, Cloud 1 experiences a problem, causing all VMs in Cloud 1 (namely VM1 and VM4) to either lose connectivity or fail. The latter may be considered equivalent to the former for the purposes of processing network traffic. The problem may, for example, be caused by a power outage, a datacentre being disconnected owing to a cabling fault, a natural disaster physically damaging the location of the datacentre, or, if Cloud 1 is a private cloud running on a small number of servers, a number of unrelated but concurrent faults that damage Cloud 1.

VNF1 and VNF2 detect the problem with Cloud 1. The acts performed by VNF1 correspond to those described above with reference to FIG. 2. VNF2 recognises the loss of VM4 in Cloud 1, which is its backup node. No remapping of the virtual IP address 172.19.1.6 for VNF2 is, however, performed at this stage as the primary for VNF2 is VM3 in Cloud 2. VNF2 may take steps to mitigate risk until the backup, VM4, is back or may continue with normal processing regardless of the failover risk (which result in a failure of VNF2). As before, throughout the handover, 172.19.1.5 and 172.19.1.6 continue to route to a working VM, which performs VNF processing.

The above embodiments are to be understood as illustrative examples. Further embodiments are envisaged.

Different arrangements of the example network 100 are envisaged, for example dependent on deployment requirements. For example, the example network 100 may or may not stretch to multiple clouds and may or may not incorporate non-cloud elements. Further, multiple nodes may appear in each of multiple clouds, all nodes may be in the same cloud and/or some nodes may not be cloud-based. However, in some examples, at least some (i.e. some or all) of the nodes are cloud-based.

In some examples, the superlay network 110 is managed centrally by a separate virtualised application, the separate virtualised application being different from virtualised applications 115, 116, 117 and 118. This provides a relatively simple implementation. In some examples, the superlay network 110 is managed by shared responsibilities between at least some of the virtualised applications 115, 116, 117 and 118. This can provide resiliency to failure.

Examples above include multiple clouds. However, a different number of clouds may be used in other examples. For example, a single cloud, or more than two clouds can be used in other examples.

In an example implementation, a (small) L2 network is contained entirely within a single cloud. A simple L3 virtual overlay network is created in the cloud. Virtualised applications which do not need the extra superlay functions use the overlay network directly. In particular, they do not comprise the superlay networking function. A gateway virtualised application is instantiated to provide a routed interface into the new superlay network. The gateway may be implemented as a redundant pair of gateway virtualised applications. The gateway virtualised application also runs a control plane for the new superlay network(s). Applications, such as virtualised applications, using higher levels of function (for example, L2/L3 failover, etc.) are installed on OS images, or in a container, with a superdriver or access package which implements the additional access technology associated with the superlay network, binding to the native overlay interfaces, and exposing virtual interfaces which correspond to each of the superlay networks. Such applications can be VMs, containers or bare-metal. The gateway or router, and enabled applications, then use the control plane to exchange access information for each entity on the L2 overlay and information about identifiers on the superlay. Together, this information can enable direct sending of packets between entities on the superlay and, where applicable, via the gateway or router outside the superlay. This allows deployment of applications in the superlay network which would not normally be runnable in a public or private L3 cloud.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of processing traffic in a virtualised environment, the virtualised environment comprising:
   a physical underlay network;
   a first overlay network, the first overlay network being an overlay of the physical underlay network and being associated with a first set of network addresses;
   a second overlay network, the second overlay network being an overlay of the first overlay network and being associated with a second set of network addresses; and
   a plurality of virtualised applications, each of the virtualised applications in the plurality of virtualised applications having an execution environment and being associated with at least one network address in the first set of network addresses and at least one network address in the second set of network addresses,
   the method comprising performing, in the execution environment of a first virtualised application in the plurality of virtualised applications, encapsulation of traffic communicated from the first virtualised application to the first overlay network and/or decapsulation of traffic communicated from the first overlay network to the first virtualised application, wherein the execution environment of the first virtualised application comprises the first virtualised application and a networking component, and wherein said encapsulation and/or decapsulation is performed by the networking component, and
   wherein tenant separation processing is performed outside the execution environments of the plurality of virtualised applications.

2. The method of claim 1, wherein the tenant separation processing is performed in the physical underlay network and/or is performed by a hypervisor.

3. The method of claim 1, wherein the tenant separation processing is performed using Virtual Local Area Network, VLAN, tags and/or at least one Access Control List, ACL.

4. The method of claim 1, wherein:
   said encapsulation and/or decapsulation comprises Virtual Extensible Local Area Network, VXLAN, encapsulation and/or decapsulation; and/or
   the other component is packaged in the execution environment of the first virtual application as a Data Plane Development Kit, DPDK, module.

5. The method of claim 1, wherein:
   the first virtualised application is associated with:
      a first network address in the first set of network addresses; and
      first and second network addresses in the second set of network addresses; and
   a second virtualised application in the plurality of virtualised applications is associated with:
      a second network address in the first set of network addresses;
      the first network address in the second set of network addresses; and
      a third network address in the second set of network addresses.

6. The method of claim 5, wherein the first set of network addresses comprises first and second subsets of network addresses associated with first and second clouds respectively, wherein the first network address in the first set of network addresses is associated with the first cloud, and wherein the second network address in the first set of network addresses is associated with the second cloud.

7. The method of claim 5, wherein the first network address in the second set of network addresses is a virtual IP address.

8. The method of claim 5, wherein the first virtualised application serves as a primary virtualised application for a Virtualised Network Function, VNF, and the second virtualised application serves as a backup virtualised application for the VNF.

9. The method of claim 5, comprising:
   receiving, at a third virtualised application in the plurality of virtualised applications, traffic directed to the first network address in the second set of network addresses;
   determining, by the third virtualised application, whether the second or third network address in the second set of network addresses is currently associated with the first network address in the second set of network addresses; and
   transmitting, by the third virtualised application and via the first overlay network:
      encapsulated data comprising the received traffic to the first virtualised application using the first network address in the first set of network addresses in response to determining that the second network address in the second set of network addresses is currently associated with the first network address in the second set of network addresses; or encapsulated data comprising the received traffic to the second virtualised application using the second network address in the first set of network addresses in response to determining that the third network address in the second set of network addresses is currently associated with the first network address in the second set of network addresses.

10. The method of claim 9, wherein the traffic is received from an application having a network address associated with a network different from the first and second overlay networks.

11. The method of claim 10, wherein the application is a non-virtualised application.

12. The method of claim 9, wherein the third virtualised application provides gateway functionality.

13. The method of claim 1, wherein a given virtualised application of the plurality of virtualised applications communicates traffic with the first overlay network without said encapsulation and/or decapsulation being performed within the execution environment of the given virtualisation application.

14. The method of claim 1, wherein at least one of the plurality of virtualised applications provides telephony network element functionality.

15. The method of claim 14, wherein the telephony network element functionality comprises:
Session Border Controller, SBC, functionality;
Telephony Application Server, TAS, functionality;
cellular network core functionality; and/or
application server, AS, functionality.

16. A virtualised environment configured to perform the method of claim 1.

17. A method of processing traffic in a virtualised environment, the virtualised environment comprising a physical underlay, an overlay network, and a virtualised application, wherein the physical underlay and/or the overlay network comprises a security element configured to provide tenant separation processing, the method comprising:
receiving encapsulated traffic from the overlay network, the encapsulated traffic having been subject to tenant separation processing by the security element;
decapsulating the received traffic; and
providing the decapsulated traffic to the virtualised application,
wherein the method is performed by a networking component in the execution environment of the virtualised application, and
wherein the networking component is separate from the virtualised application.

18. A virtualised environment comprising: a physical underlay, an overlay network, and a plurality of virtualised applications,
wherein an execution environment of a first virtualised application of the plurality of virtualised applications comprises a networking component configured to perform one or both of:
(i) encapsulating traffic received from the first virtualised application and providing the encapsulated traffic to the overlay network; and
(ii) decapsulating encapsulated traffic received from the overlay network and providing the decapsulated traffic to the first virtualised application, and
wherein an execution environment of a second virtualised application of the plurality of virtualised applications is configured to perform one or both of:
(i) providing traffic received from the first virtualised application to the overlay network without performing said encapsulating; and
(ii) providing traffic received from the overlay network to the first virtualised application without performing said decapsulating.

* * * * *